Dec. 28, 1943.   S. B. JAMIESON   2,337,609
VEHICLE AXLE
Filed July 7, 1942   2 Sheets-Sheet 1

S. B. Jamieson
INVENTOR.
BY Knowles

Dec. 28, 1943.　　　S. B. JAMIESON　　　2,337,609
VEHICLE AXLE
Filed July 7, 1942　　　2 Sheets-Sheet 2
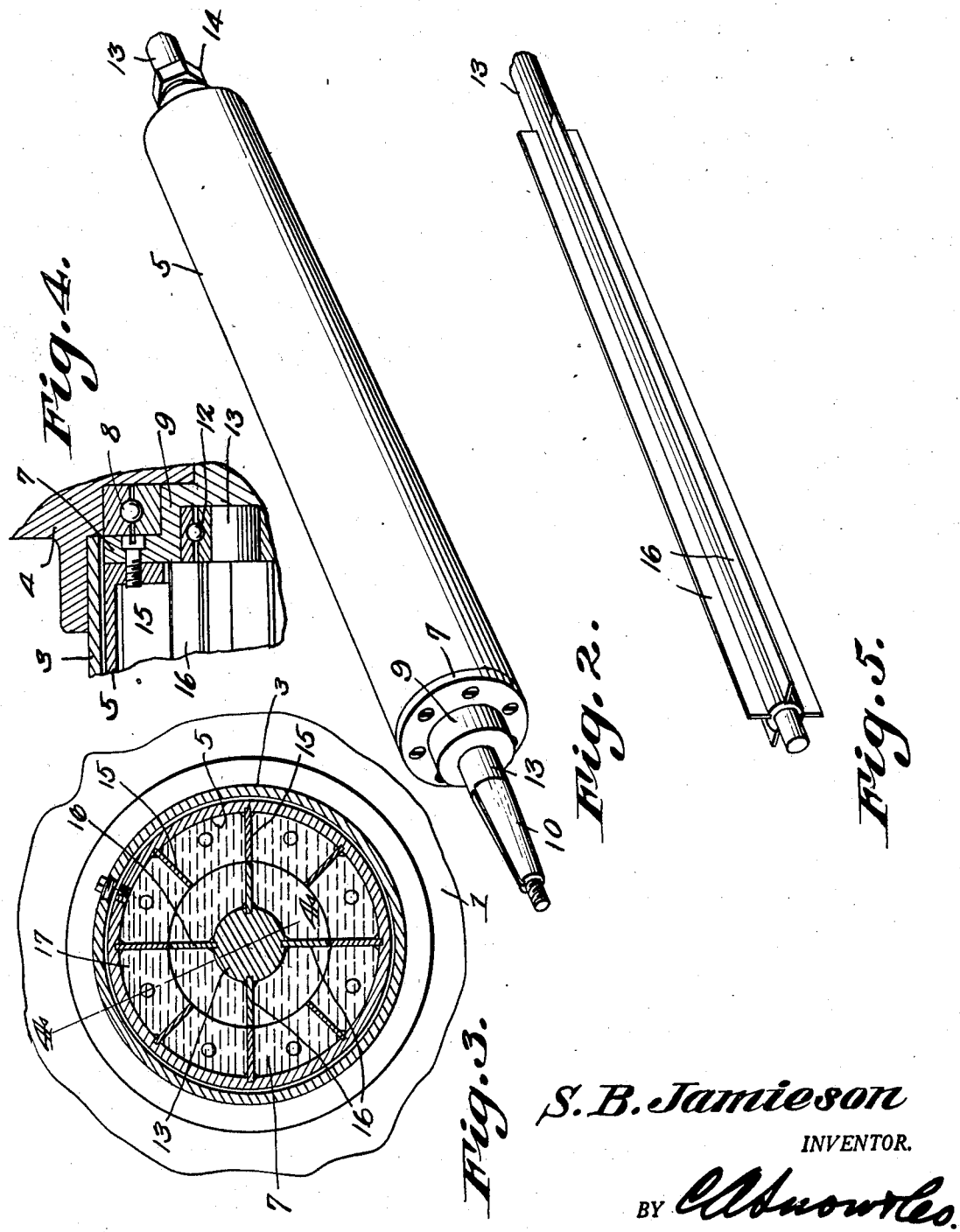
S. B. Jamieson
INVENTOR.

Patented Dec. 28, 1943

2,337,609

UNITED STATES PATENT OFFICE 2,337,609

VEHICLE AXLE

Sanford B. Jamieson, Niagara Falls, N. Y.

Application July 7, 1942, Serial No. 450,026

1 Claim. (Cl. 180—75)

This invention relates to an axle for motor vehicles and more especially to a means housed within the axle whereby motion will be transmitted through a fluid medium from a differential to the wheels of the vehicle.

A further object is to provide a structure of this character which is simple, compact and durable in construction and provides an efficient fluid drive for the respective wheels of the vehicle.

With the foregoing and other objects in view, which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

In the accompanying drawings the preferred form of the invention has been shown.

In said drawings

Figure 2 is a perspective view of the assembled rotary elements to be interposed between the differential and a wheel of the vehicle.

Figure 3 is an enlarged section on line 3—3, Figure 1.

Figure 4 is an enlarged section through a portion of the outer bearings in one end of the axle.

Figure 5 is a perspective view of the primary rotor of the fluid drive.

Figure 1:
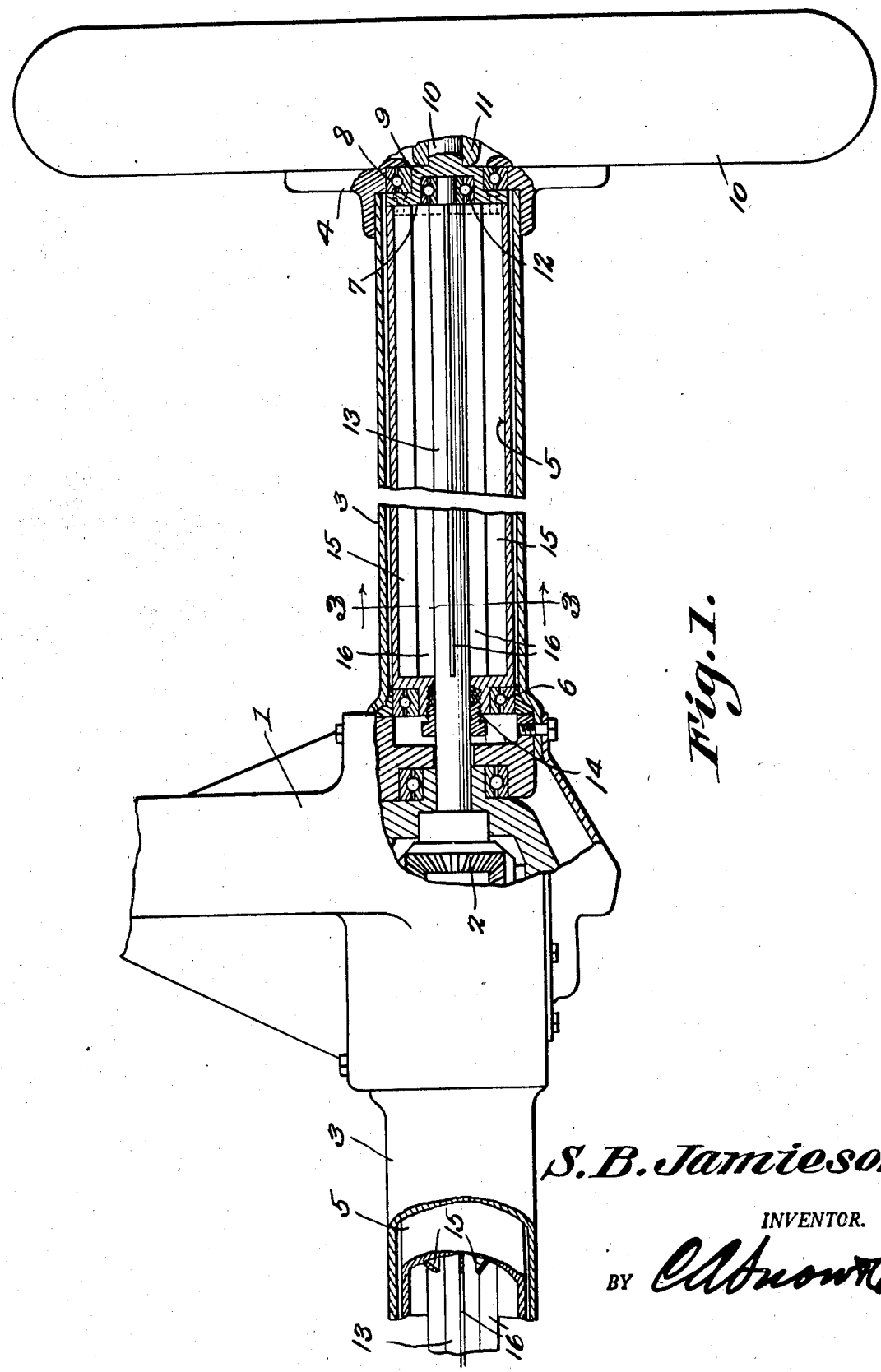
Figure 1 is a view partly in plan and partly in section of a portion of an axle provided with the present improvement.

Referring to the figures by characters of reference, 1 designates the housing of a differential indicated generally at 2 and which is of the usual construction. In the present case, however, the oppositely extending alined shafts which ordinarily are joined to the vehicle wheels, are not connected directly to the wheels. Instead tubular axle members 3 are fixedly connected to opposed portions of the housing 1 and extended in opposite directions therefrom, these axle members being coaxial and provided at their outer ends with caps 4 which, in the structure illustrated, can constitute brake drum housings.

Within each of the axle members 3 is a tubular driven shaft 5 mounted, at one end, in a bearing 6 while its other end, to which is securely fastened an end plate 7, is supported by a bearing 8 within the cap 4, said end plate 7 being provided with a boss 9 surrounded by the bearing 8, as shown. A stud 10 is extended outwardly from the center of the boss 9 and a vehicle wheel 10 has its hub portion 11 secured thereto in the usual or any preferred manner.

The inner side of the end plate 7 is recessed to receive a bearing 12 and extending into this bearing is one end of the primary rotor of the device which constitutes one of the shafts 13 receiving motion from the differential 2. This shaft is rotatably mounted in the inner end of the driven tubular shaft 5 where suitable packing is provided, as shown at 14, to prevent leakage of fluid from the interior of the tubular shaft 5.

Arranged longitudinally along the inner surface of the tubular shaft are fins 15 and additional fins 16 are carried by and extended longitudinally of the primary rotor or shaft 13. All of the fins extend throughout the length of the interior of tubular shaft 5 and the fins are so proportioned that those on the shaft 13 will pass close to but out of contact with the fins 15 during the relative rotation of the parts 5 and 13. This will be apparent by referring to Fig. 3.

The structure heretofore described is duplicated in each of the tubular axle members 3 and it is to be understood, of course, that the shafts 5 and 13 at both sides of the housing 1 are coaxial.

The interior of each tubular driven shaft 5 is filled with a suitable fluid. This has been indicated generally at 17 in Fig. 3. When motion is transmitted to the alined oppositely extending primary rotors or shafts 13 through the differential 2, they will be driven in the same direction and will set up a circulation of the fluid contained within each tubular shaft, this fluid, in turn, transmitting motion to the fins 15 in the tubular shaft with the result that wheel 10 which is joined to and rotates with the tubular shaft will be caused to rotate.

It is to be understood that the mechanism herein described can be used in connection with two or more wheels of a vehicle and, if desired, can also be incorporated in the running gear of a trailer, motion being transmitted thereto through a flexible shaft or any other obvious manner from the transmission mechanism of the towing vehicle. Such an arrangement is so obvious that detailed description or illustration thereof is not deemed necessary.

What is claimed is:

The combination with a differential housing and oppositely extending coaxial tubular axle members secured to said housing, of bearings adjacent to and supported by the end portions of each axle member, a tubular shaft journalled at one end within one of the bearings, an end plate detachably secured to the other end of the shaft and journalled in the other bearing, means for securing a vehicle wheel to the end plate for rotation therewith, a shaft extending from the differential into each of the tubular shafts and bearing at its ends in one end of the tubular shaft and in the end plate of said shaft, said shafts being coaxial, longitudinal fins carried by the two shafts in each axle member, all of the fins being radially disposed and located within the tubular shaft, said fins being proportioned to remain out of contact with each other during relative rotation of the shafts, and a transmission fluid sealed within the tubular shaft in contact with all of the fins therein.

SANFORD B. JAMIESON.